United States Patent
Swartz

[11] 3,773,355
[45] Nov. 20, 1973

[54] BICYCLE PASSENGER FOOT SUPPORT

[76] Inventor: Clarence J. Swartz, 23971 Masch, Warren, Mich. 48091

[22] Filed: June 18, 1971

[21] Appl. No.: 154,276

[52] U.S. Cl............................... 280/291, 280/165
[51] Int. Cl............................................. B62j 25/00
[58] Field of Search.......................... 280/291, 165; 248/293, 240.4

[56] References Cited
FOREIGN PATENTS OR APPLICATIONS
69,035   9/1936   Netherlands....................... 280/291
481,630   6/1953   Italy.................................. 280/291

Primary Examiner—Kenneth H. Betts
Assistant Examiner—David M. Mitchell
Attorney—Dale A. Winnie et al.

[57] ABSTRACT

A foot support for bicycle passengers which includes a bracket fastened to a bicycle fork, fender support, or the like, rests on the wheel axle, and which has a foot rest member that is pivotal thereon so that it can be fixed in a weight supporting outwardly disposed position or a folded in and out of the way position.

4 Claims, 7 Drawing Figures

PATENTED NOV 20 1973　　　3,773,355

INVENTOR.
Clarence J. Swartz
BY
Winnie & Romanski
ATTORNEYS

BICYCLE PASSENGER FOOT SUPPORT

BACKGROUND OF THE INVENTION

It is quite normal for youngsters, in riding their bicycle, to carry a passenger on the rear wheel fender, or package rack, with his feet tucked in and catching the small ends of the axle shaft beneath him. Or they will have their passenger sit on the bicycle seat, with their legs out for balance, or on the axle shaft, while they stand up and pump the bike.

Some youngsters even ride on the front fender, facing forward with their knees bent, legs in and a bare toe hold on the ends of the front wheel axle shaft, while they hang onto the handle bars behind them.

Needless to say, this is very dangerous

What they need is some type of foot rest or support at the axle shaft, or thereabouts, that they can use to keep their feet reasonably away from the spokes of the wheel and on which they can depend when it is necessary to shift their weight as the bicycle turns corners, goes over bumps etc.

Although a few such devices have been suggested before, they have been of a fixed and permanent type that stick out from the wheels and catch on things, when no one is riding on them, and the rider is not as conscious of the problem. Consequently they have not been adopted and received the popularity the idea itself deserves.

What is needed is a simple arrangement that will allow the foot support or rest to be extended outwardly for use, when needed, and to be otherwise folded-in and out of the way.

SUMMARY OF THE INVENTION

This invention relates to a foot support for bicycle passengers that includes two stamped pieces pivotally connected together.

A bracket member, for fixed attachment to the bike, has a pair of outwardly disposed flanges that recieve a foot rest member between them on a pivotal arrangement which allows the foot rest member to be locked in an outwardly disposed and weight supporting position or to be folded up or down and out of the way, when it is not in use.

The bracket member is formed to fit on the end of the axle shaft of either wheel, and a clamp is used to fasten it to the bicycle so that the weight on the foot rest member is carried by the wheel and not on the frame, fender support or whatever else it might be attached to.

An enlarged slot in the side wall flanges of the foot rest member, through which the pivot pin extends, may be used to allow pivotal movement for swinging it up and out of the way. Or, a downwardly inclined slot may be used to enable it to be lifted and then pivoted as an alternate construction downwardly.

These and other features of importance will be more fully described and discussed in the detailed description which follows and which has reference to the preferred embodiment shown in the accompanying drawing.

DESCRIPTION OF THE DRAWING FIGURES

DETAILED DESCEIPTION OF ILLUSTRATED EMBODIMENTS

Figure 1:
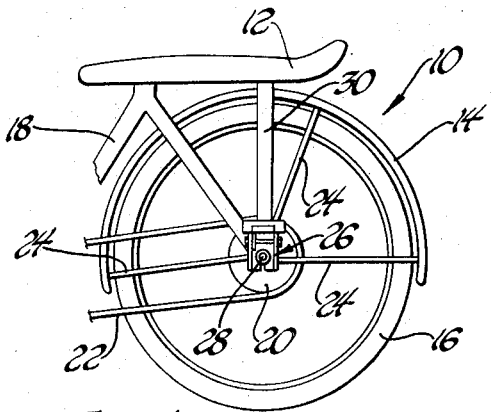
FIG. 1 is a side view of the back end of a bicycle showing the foot support of the present invention mounted for use on the back wheel.
Figure 2:
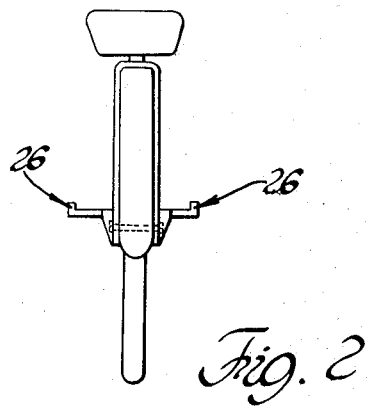
FIG. 2 is a rear end view of the same bicycle showing the foot supports as they project out on each side of the back wheel.
Figure 3:
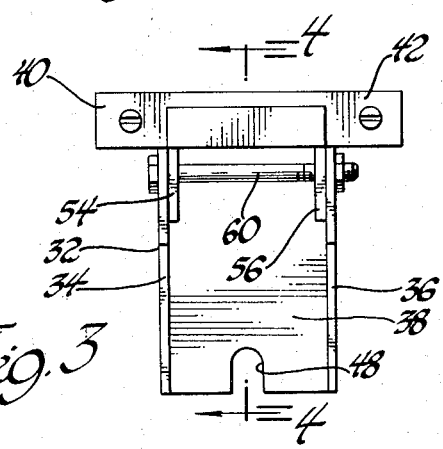
FIG. 3 is an enlarged view of the foot rest and bracket members, with the foot rest up and in position to be used.
Figure 4:
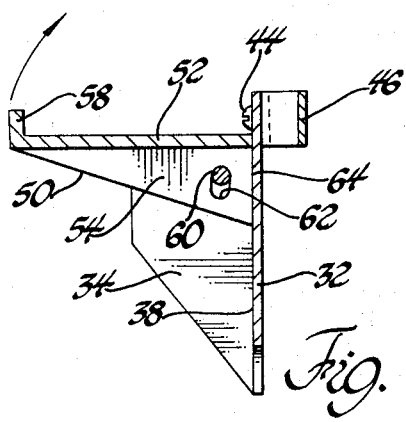
FIG. 4 is a cross-sectional view taken in the plane of line 4—4 in the previous drawing figure to show the structure and pivotal connection more clearly.

The foot support for bicycle passengers that is hereinafter described may be used on either the front or back wheel of a bicycle, but is shown as mounted for use on a back wheel since this will be most common.

The back end of the bicycle 10 is shown with a long banana seat 12 extending over the rear fender 14 of the back wheel 16. The bike frame 18, drive sprocket 20 and chain 22 are shown for reference and certain fender stays 24 are also illustrated.

The foot support 26 is shown supported on the protruding end of the axle shaft 28 and fastened to a support 30 for the seat. It can go on the outer end of the axle shaft, with a retaining nut of its own or fit under the usual shaft nut as is common with the fender stays 24, for example. Similarly, it can be fastened to any convenient support or frame member part of the bicycle that is over the axle shaft position, other than the seat support which is shown.

The assembly includes a bracket member 32 which is a flat stamping formed to include two relatively parallel spaced flanges 34 and 36 extending out from a back wall plate 38. The bracket member also includes a cross piece at the top providing ears 40 and 42 with holes for bolt and nut fasteners 44 to hold a hat shaped clamping member 46 to it, which in turn fastens the bracket member to the bicycle, as previously discussed.

An open slot 48 at the lower edge of the bracket is formed to be received over the axle shaft of a wheel and so that the weight carried by the bracket is carried through to the wheel.

A foot rest member 50 is received inbetween the bracket flanges 34 and 36 and is pivotally connected to them at its inner end. The foot rest includes a flat foot rest part 52 and depending side wall flanges 54 and 56. It is also turned up, at its outer end to provide a foot stop 58.

The pivotal connection between the bracket and foot rest members includes a pivot pin 60 that goes through and between the bracket and foot rest flanges. It has a head on one end and is threaded for a lock nut on the other end (not specifically identified). The holes 62 in the foot rest flanges that it passes through are elongated and enlarged so that the foot rest member 50 can be pivoted up and out of the way. When it is extended out, as shown in the first four drawing figures, and has any weight on it (even its own) the back edges 64 of the flanges 54 and 56 bear against the back wall 38 of the bracket part and serve as shoulder stops that keep it erect.

Figure 5:
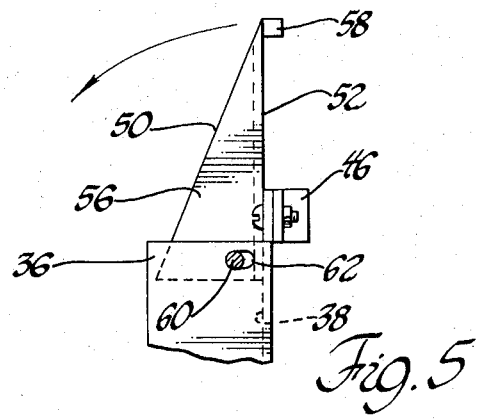
FIG. 5 is a side elevation showing the foot rest member folded up within the bracket.

FIG. 5 shows the foot rest member 50 folded up and out of the way. The back edges of the flanges 54 and 56 are still within the bracket flanges 34 and 36. And, by having either a modestly tight fit or some converging together of the bracket flanges, it will be appreciated that there can be enough frictional engagement to hold it in this folded up position.

Figure 6:
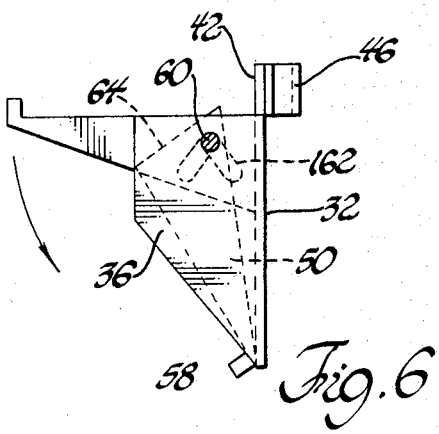
FIG. 6 is a side elevational view of another construction with a foot rest member that may be folded down out of the way.
Figure 7:
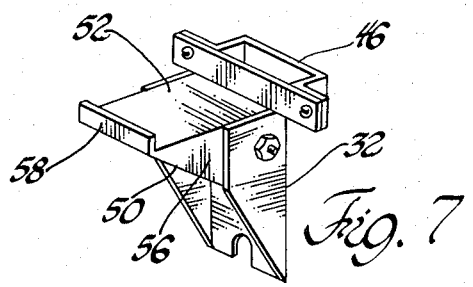
FIG. 7 is a perspective view of the whole assembly.

FIG. 6 shows an alternate construction in which the same parts are used, and so the same numeral designations are used, except for an elongated and inclined slot 162 that extends towards the lower corner or point on the foot rest flanges 54 and 56. The use of this particular type slot enables the foot rest member to be pulled out and lifted enough to then be pivoted down, instead of up, as with the other arrangement.

As before, when the foot rest member is in position for use any weight on it, even its own weight, causes it to have its back edges 64 in shoulder stopping engagement with the back wall 38 of the bracket part so that it can't be folded down unintentionally.

From the foregoing it can be seen that the two piece assembly, three with the clamp, is inexpensive to manufacture and simple to assemble and mount on a bicycle. Any youngster can do it.

With the first embodiment shown and described, the foot rest member 50 is merely pulled out and pivoted down into its should stopped position, ready for use. When not needed, it is pivoted back up and out of the way.

With the alternate construction, the elongated slot 162 enables the foot rest member to be pivoted down and frictionally held between the two bracket flanges, when not needed, and to be pivoted up and then allowed or made to set back into its shoulder locked and weight supporting position for use.

I claim:

1. A foot support for bicycle passengers, comprising, a bracket member for fixed attachment to a part of a bicycle, a pair of outwardly extending flanges on said bracket member disposed in parallel spaced relation to each other, a foot rest member having one end received between said flanges and pivotally engaged thereto, and means for locking said foot rest member in an outwardly disposed weight supporting position and for folding out of the way when not in use, said bracket member including a back wall part from which the flanges thereof are formed, said foot rest member being generally channel shaped in cross-section and tapered towards it outer end, and with the channel forming side walls thereof extending downwardly in the outwardly disposed disposition of the foot rest member, a pivot pin member extending across and between said bracket member flanges and through the side walls of said channel shaped foot rest member at a position providing back wall engagement by said foot rest member side walls at the inner end for holding the latter disposed for use, and one of said bracket flanges and foot rest member side walls having elongated holes disposed to permit relative movement of said pivot pin member therein for pivotally folding said foot rest member down and for disposing said foot rest member in an erected back wall stopped and locked disposition on said bracket member.

2. A foot support for bicycle passengers, comprising of bracket member for fixed attachment to a part of a bicycle and having a back wall plate with a pair of flanges extending outwardly therefrom in parallel spaced relation to each other, said back wall plate having an open slot at its lower edge for receiving one end of the axle shaft of a bicycle wheel therethrough and having weight supporting engagement thereon, a foot rest member having one end received between said bracket flanges and including reinforcing side wall flanges of its own received in close engagement therewith, a pivot pin member received through and between said bracket and foot rest flanges for pivotally engaging said foot rest member on said bracket member, an enlarged hole provided in one of said bracket and foot rest flanges through which said pivot pin extends to allow fold away pivotal movement of said foot rest member and erection thereof, said foot rest flanges having the back edges thereof received in shoulder stop engagement with the back wall plate of said bracket member when said foot rest member is disposed for use.

3. The foot support for bicycle passengers of claim 2, said foot rest member having frictional engagement between said bracket flanges for relative retention thereof.

4. The foot support for bicycle passengers of claim 2, said hole being inwardly inclined and elongated to permit said foot rest member to be pulled out, up and pivoted down into a frictionally held engagement substantially wholly within the protection of said bracket flanges.

* * * * *